United States Patent [19]

Spotts et al.

[11] 4,110,600
[45] Aug. 29, 1978

[54] THERMOSTATICALLY CONTROLLED PLURAL HEAT OUTPUT PORTABLE ELECTRIC SPACE HEATER

[75] Inventors: Willard J. Spotts, Boonville; Peter E. Huggler, Columbia, both of Mo.

[73] Assignee: McGraw-Edison Company, Elgin, Ill.

[21] Appl. No.: 699,436

[22] Filed: Jun. 24, 1976

[51] Int. Cl.² .................. F24H 3/04; H05B 1/02
[52] U.S. Cl. ............ 219/364; 126/110 AA; 219/366; 219/370; 219/374; 219/376; 219/377; 219/486; 219/508
[58] Field of Search .................. 219/359–382, 219/483–487, 491, 509, 510, 494, 364, 375, 376, 508; 236/1 E, 1 F; 126/101, 110 AA, 110 R

[56] References Cited

U.S. PATENT DOCUMENTS

| 1,798,290 | 3/1931 | Winner et al. | 219/368 |
| 2,647,198 | 7/1953 | Lauther | 219/366 |
| 3,523,180 | 8/1970 | Kennedy | 219/370 |
| 3,855,450 | 12/1974 | O'Connor | 219/364 X |

FOREIGN PATENT DOCUMENTS 215,358  1/1942  Switzerland ............... 219/368

*Primary Examiner*—A. Bartis
*Attorney, Agent, or Firm*—Ronald J. LaPorte; Jon C. Gealow

[57] ABSTRACT

A portable electric space heater has a case that surrounds separate electric heating elements, and the case has separated upper and lower airflow openings. A control switch allows manual selection of two different operating cycles, respectively suited for heater use in a large room requiring heater outputs approximately 65 to 100% of maximum to maintain a comfort level, and in a small room requiring heater outputs of only 20 to 100% of maximum. Thermostatic controls respond to the sensed ambient air temperatures to shift the heater operation automatically, in either operating cycle, for maximum heat output, for a lower modulated heat output, and for no heat output. Simultaneously with this modulated heat output, air moving means located in the case is operated at different speeds, at maximum speeds for the high heat outputs and lesser speeds or is even stopped for the lower or no heat outputs. The operating air moving means causes the air heated to discharge from the heater case out the lower openings; whereas the air moving means does not operate in a preferred lowest heat output condition to have convective heated air discharge out the upper case openings. Specific control circuits utilize the heating elements as voltage dividers to alter the output speeds of a single speed motor powering the air moving means as indicated, and also to modulate the heat outputs.

15 Claims, 8 Drawing Figures

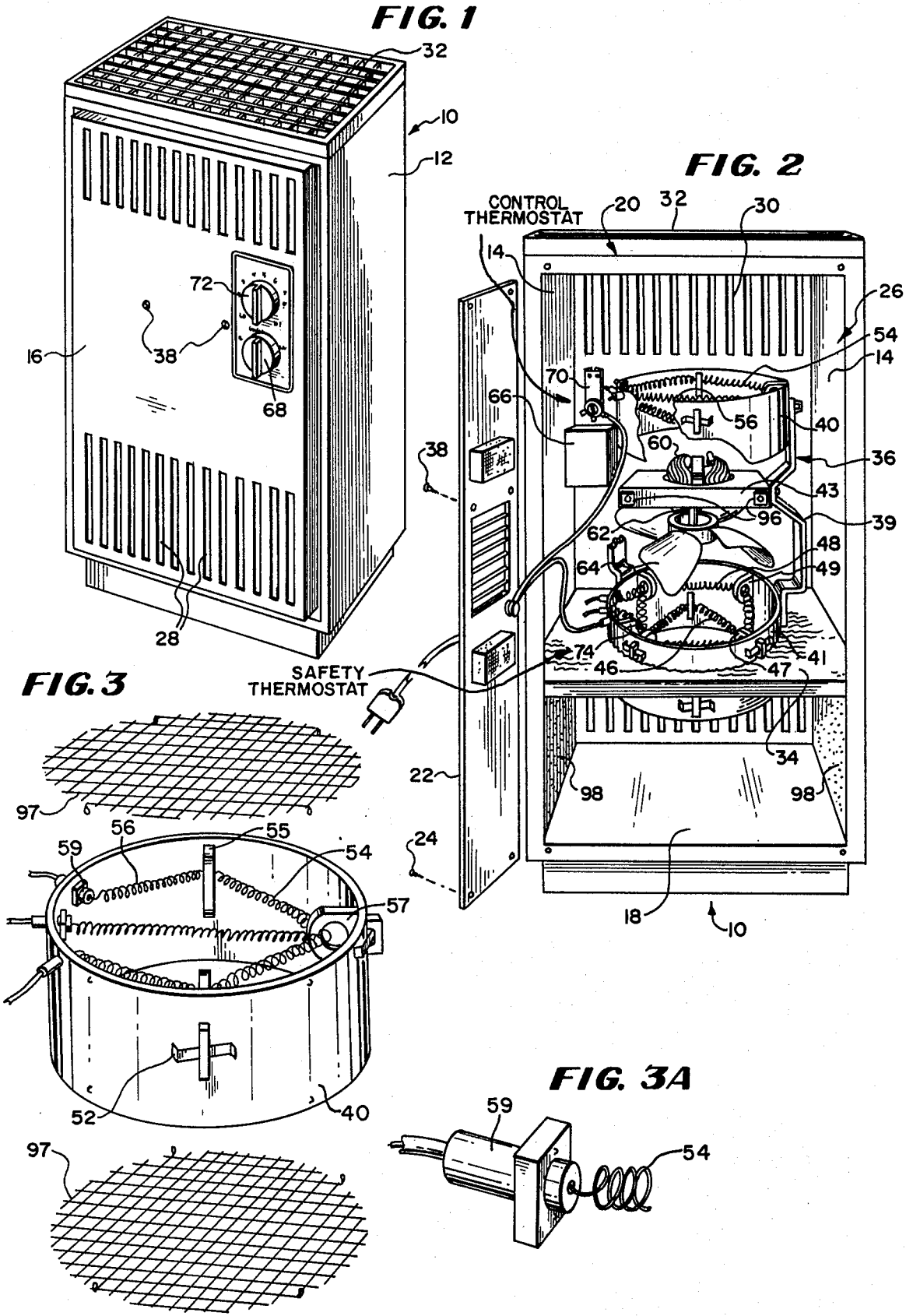

THERMOSTATICALLY CONTROLLED PLURAL HEAT OUTPUT PORTABLE ELECTRIC SPACE HEATER

BACKGROUND OF THE INVENTION

It is commonplace to utilize a portable electric space heater as a sole or supplemental source for heating rooms of personal dwellings, baths, garages, work areas, or the like as the occasion to use such chilled area arises. Conventionally there is some thermostatic control for energizing the heater only up to a specified temperature, and then for deenergizing the heater. Some heaters have only radiant or convective heat distribution, while others use a fan for circulating the ambient air through the heater for more rapid and even heat distribution to the surroundings.

Thus far, commerically available portable electric space heaters have lacked accurate means of regulating the heat output to the end that the heater either was energized or was deenergized. This operation is less than satisfying since without any heat being emitted from the deenergized heater, cold sensations or drafts frequently cause discomfort; whereas continuous operation of the heater at the high level output might direct excessive heat for uncomfortable or even unsafe conditions.

Further commerical considerations are the degree of portability and attractiveness of the heater which might readily blend in with the background decor. The heater also must have safety standards to minimize the possibility of electrically shocking an individual because of exposed heating elements or of burning an individual because of excessively high operating case temperatures.

Various patents which illustrate heaters of the general type discussed herein, as well as which show various control circuits which heretofore have been employed are illustrated in U.S. Pat. No. 1,107,319 - F. Kuhn; U.S. Pat. No. 1,982,139 A. J. Kercher; U.S. Pat. No. 2,647,198 - M. E. Lautner; U.S. Pat. No. 2,697,164 - A. S. Knapp et al; U.S. Pat. No. 2,722,594 - J. J. Kueser; U.S. Pat. No. 3,019,324 - J. P. Sohn; and U.S. Pat. No. 3,114,812 - R. N. Levinn.

SUMMARY OF THE INVENTION

This invention relates to a portable electric space heater that has a case that totally surrounds separate electric heating elements, and vertically spaced airflow openings are in the case vertically above and below the heating elements. Blower means in the case operate to draw ambient air into the case through the upper opening for passage over the energized heating elements and for discharge from the case out the lower opening. The heater further has thermostatic controls which automatically shift the heater as demand dictates between a high heat output condition, a lower heat output condition, and totally off or no heat output condition. Simultansously with and automatically upon these shifts in the heat output, the fan speed is likewise varied from a normal high speed operation at high heat output to a reduced speed operation or even off condition for the lower or off heat output conditions. In the lowest, but not off, heat output condition, the fan is not operating so that airflow through the heater case is by convection only; and thus the ambient air enters the lower opening for passage over the energized heating elements and discharge from the upper case opening.

The heater utilizes standard electric heating and control components to minimize the initial costs even with the preferred described mode of operation. The blower motor is a single speed motor, but is connected in specific parallel and series circuits with the heating elements in order to alter the voltage to the motor and thereby vary the blower speeds between the maximum, a reduced or modulated speed, and a non-operating or stalled condition. The heating elements themselves are grouped in various circuits to produce the maximum heat output and various reduced stages of heat outputs. The specific components required for such circuits include a single three-position switch having four stacked separate control contacts; a thermostat having two sets of operative control contacts; four heating elements which serve both to produce the required heat and as voltage dividers for varying the blower speed; and a control selection switch having an off setting and two operative cycle settings.

The heating elements being housed inside the case are safely kept beyond the reach of anyone, and the forced air circulation through the heater at all high heat output conditions maintains a safe cool exterior case temperature.

BRIEF DESCRIPTION OF THE DRAWINGS

FIG. 1 is a perspective view of the disclosed heater, looking downwardly from the front and side thereof;

FIG. 2 is a rearward perspective view of the heater of FIG. 1, with the rear panel removed and shown in an exploded fashion;

FIG. 3 is a perspective view of a tubular frame used for holding the particular heating elements of the subject heater;

FIG. 3A is a perspective view of a typical insulator terminal used in the heater element mounting of FIG. 3;

DETAILED DESCRIPTION OF THE INVENTION

Figure 4:
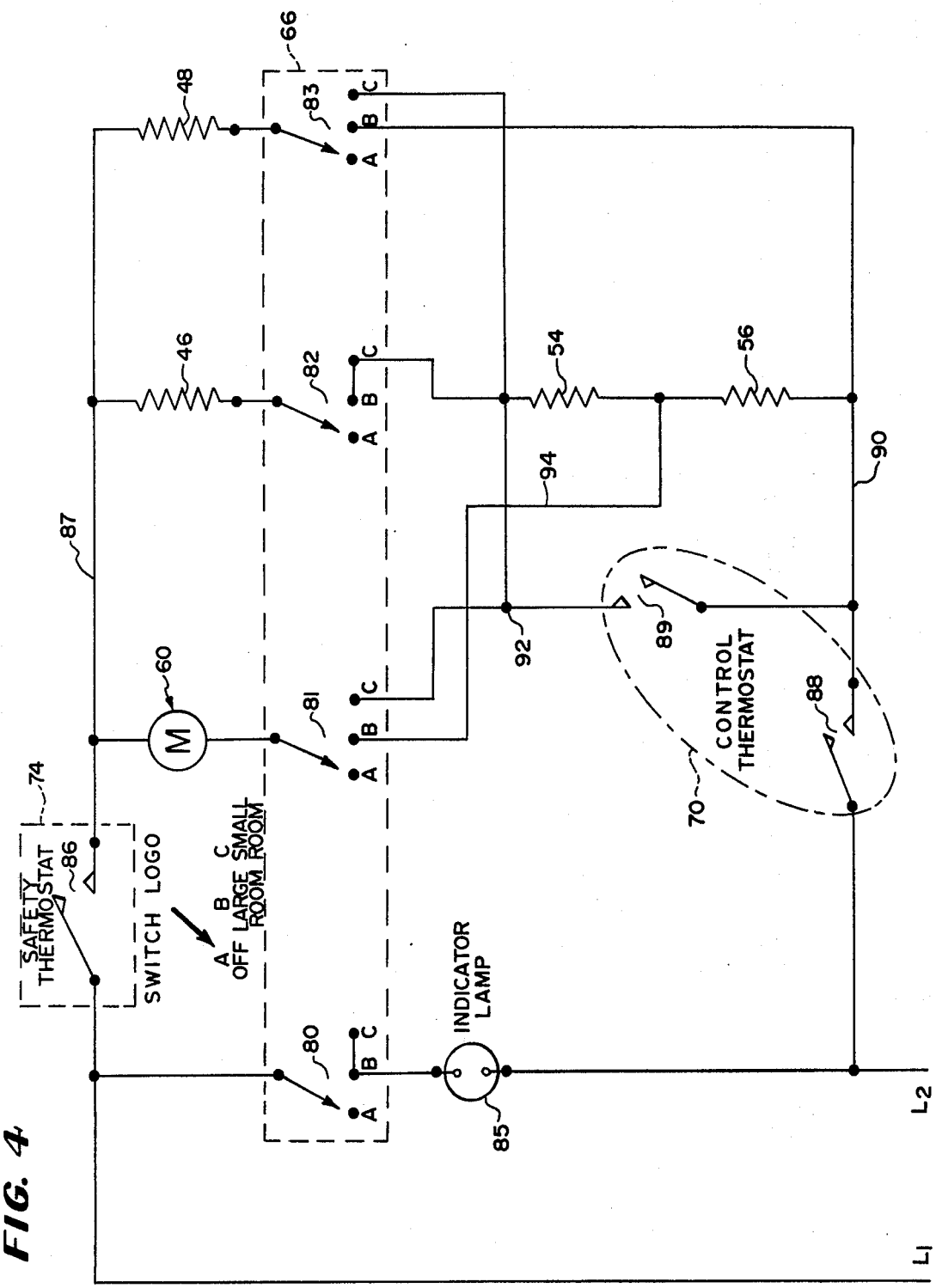
FIG. 4 is a schematic view showing the preferred electric control of the disclosed heater and the associated mode of operation thereof.
Figure 2A:
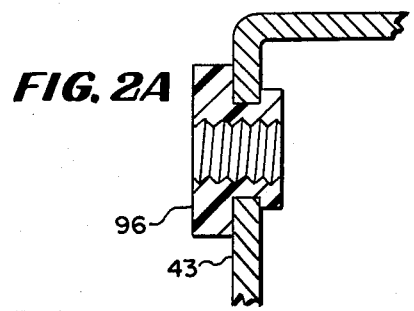
FIG. 2a is a partial sectional view of FIG. 2 taken through plate 43 and insulator 96.

The illustrated preferred embodiment of heater 10 includes a case 12 having oppossed side walls 14, and front, bottom, and top walls 16, 18, and 20 respectively, that extend between and interconnect with these side walls. A panel 22 removably connected by screws 24 to the rear edges of the case walls, when secured in place, defines an enclosure 26 within the case. There are openings 28 formed in the front wall 16 adjacent the bottom of the enclosure and openings 30 formed in the front wall adjacent the top of the enclosure, and the top wall 20 has louvered openings (not shown) formed therein; and a decorative plastic grill 32 is secured to the case over the perforated top wall. A horizontal baffle 34 is supported by the case and thus separates the enclosure into lower and upper sections which communicate respectively with the bottom openings 28 and with the top openings 30 and 32.

A frame assembly 36 is secured to the opposed front and rear walls of the case by appropriate screws 38 and forms the support for the heating elements and the air moving fan means. The assembly includes spaced brackets 39 connected at their opposite ends to annular members or drums 40 and 41 and connected intermediate these members to a fan mounting plate 43. A pair of lower heating elements 46 and 48 are supported on appropriate insulators 47 and 49 respectively from the bottom frame 41 and have appropriate end connections with terminals carried on but insulated from the frame as is conventional. Each insulator can fit through an opening in the annular frame and be retained therein by means of a clip 52 fitting through an opening in the insulator itself. A pair of upper heating elements 54 and 56 are supported again by insulators 55 and 57 respectively from the top annular frame 40 and likewise their end connections are appropriately made with end terminals 59 supported on the annular frame. Each heating element likewise is of a coiled Nichrome wire of appropriate resistance and wattage.

A shaded pole motor 60 is supported on the frame 43 and includes a stationary field and a rotating armature having a shaft 62 disposed generally axially of the two annular frames 40 and 41. Air moving means in the form of a fan blade 64 assembly is keyed to the shaft 62 to rotate therewith. Operation of the fan causes the ambient air outside of the heater case to enter through the top openings 30 and 32 and to pass in heat transfer relationship over the heating elements 54, 56 and 46, 48, respectively carried in the annular frame members and to be discharged from the bottom opening 28 from the heater to the ambient in close proximity to the floor. This is a preferred mode of heater operation where heated air is directed to the surroundings adjacent the floor which typically would be at a cooler temperature than the air located higher off the floor. Since the lower frame 41 fits within the opening of the baffle 34, any air passing from one enclosure section to the other enclosure section must pass through this annular frame member 41 and over the heating elements therein.

A cycle control switch 66 is secured to the front wall of the case and has an appropriate exposed knob 68 suited for manual manipulation to allow the operator to select a specific heat mode of operation to be discussed. A control thermostat 70 likewise is supported on the front wall of the unit in heat sensing relation with the air inside the enclosure and further has an exposed knob 72 to allow manual adjustment of the thermostat and the operating temperature ranges of the heater. The thermostat 70 preferably includes a bimetal located in heat sensing relation to the enclosure air, which bimetal actuates two sets of contacts 88 and 89 responsive to a sensed temperature, where further manipulation of the manual knob allows adjustment of the opening and closing temperatures of such sets of contacts. The specific construction can be similar to that shown in U.S. Pat. No. 3,114,812 issued to R. N. Levinn. The cycle selection switch 66 preferably has four separate sets of contacts that are simultaneously shifted between an off position and two operating settings of the heater. There further can be provided in the heater enclosure 26 a safety thermostat 74 which can operate as will be described in an appropriate manner to preclude excess heat development in the heater should any other control component fail.

The preferred mode of operation of the subject heater will now be disclosed. As mentioned, the control switch 66 has an off setting and two operative settings; where one operative setting might be used for heater control in a low heat loss application such as might be experienced in a small room, while the other operative switch setting might be used for heater control in a high heat loss environment such as might be experienced in a larger room, a poorly insulated room, or on a cold day. Also, one set of contacts (89) of the thermostat 70 is opened at a temperature slightly lower by perhaps 2° to 6° F. than the temperature where the other set of contacts (8—8) opens.

FIG. 4 shows a preferred electrical schematic interconnecting the various electrical components including the control switch 66, control thermostat 70, safety thermostat 74, and heating elements 46, 48, 54 and 56 in a simplified manner while yet providing the preferred mode of operation, as previously mentioned. The illustrated control switch 66 has the four separate sets of contacts indicated at 80, 81, 82, and 83, where each set of switch contacts has a common terminal and a leaf connected from this common terminal movable to three separate terminals as indicated.

The first switch set 80 is shown in a power circuit between lines L-1 and L-2 with an indicator lamp 85, so that in all positions of the switch other than in the position as shown in FIG. 4, the indicator lamp would be illuminated indicating that the switch itself is set in a power on condition.

The safety thermostat 74 has normally closed contacts 86 in a series connection with the line L-1 and the line 87, where the line in turn is common to corresponding sides of the motor 60 and the two lower heating elements 46 and 48. The opposite sides of the motor and of the two lower heating elements are connected to the common of the switch sets 81, 82, and 83 respectively; which switch sets connect in various circuits through the control thermostat 70 to the opposite power line L-2. The control thermostat sets of contacts are identified as contacts 88 and 89, where contacts 88 are in series between the power input line L-2 and line 90 and where line 90 in turn connects through the thermostat contacts 89 to terminal 92.

In operation, both sets of contacts 88 and 89 of the thermostat would be closed during a condition where heat is to be discharged from the heater; and contacts 89 would be set to open at a temperature some 2° to 6° F. below the temperature at which the contacts 88 open. Consequently, contacts 89 are indicated herein as the heat demand contacts, while contacts 88 are to be termed herein as the heat satisfied contacts.

In the "off" condition of the control switch, the control leaf of each of the switch sets is directed to the terminal to which nothing is connected and the heater is thus totally deenergized.

Figure 5:
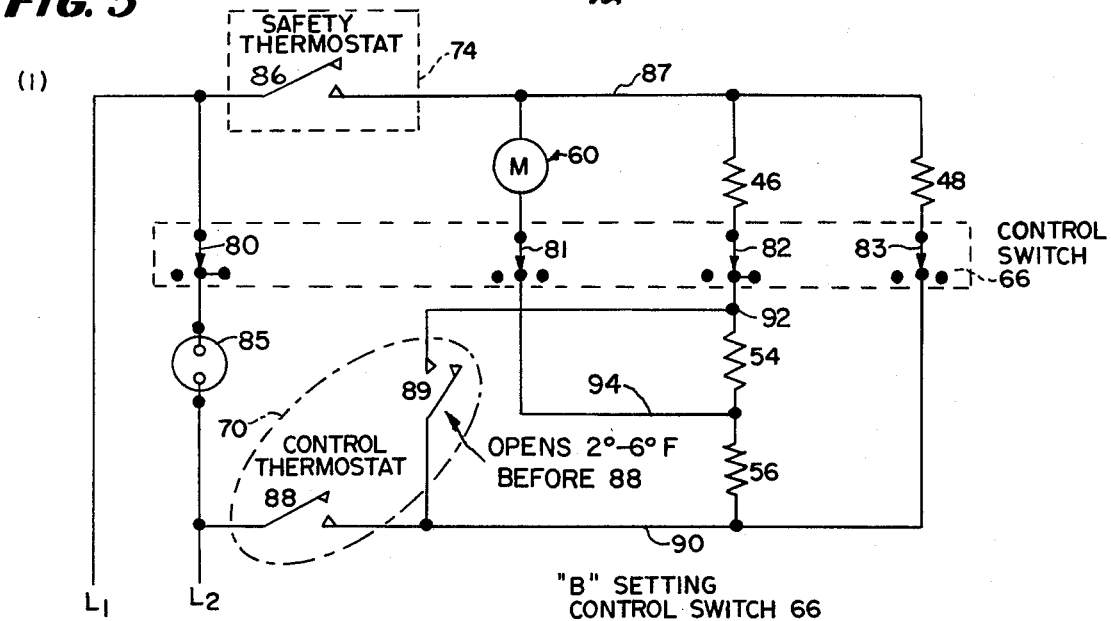
FIG. 5 is a circuit diagram of the schematic of FIG. 4 shown in a first selected operative mode.

In the middle or B operative position of the control switch 66, as illustrated in FIG. 5 of the drawings, a circuit is completed from line 87 through the motor 60 and switch set 81 to line 94, which branches via the two upper heating elements 54 and 56 respectively to the line 90 and terminal 92. Consequently under normal 120 input voltage across line L-1 and L-2 and in the heat demand situation where both thermostat contacts 88 and 89 are closed, the motor hookup passes in parallel through the two heating elements 54 and 56 and thus receives slightly less than full line voltage. In like switch configuration, the switch sets 82 and 83 complete circuits from line 87 through the heating elements 46 and 48 via the closed thermostat contacts 89 and 88 to energize the heating elements 46 and 48 to their maximum.

Assuming, a 120 volt system across line L-1 and L-2 and with a resistance of approximately 18 ohms for each lower heating element 46 and 48, there would be approximately 725 watts of output power from each of the elements assuming a 10% temperature coefficient. The fan motor windings normally would have a high resistance of approximately 250 ohms, while the heating element 54 is rated at 23 ohms and the heating element 56 is rated at 11 ohms.

This would energize the motor with approximately 116.5 volts, which would operate at approximately 95–98% full speed, and would generate approximately 56 watts of power. The voltage drop across the upper heating elements 54 and 56 is only approximately 3.5 volts so that the output power is only at most a few watts. The total maximum heat output of the system including that of the operating motor, the energized upper heating elements 54 and 56, and the energized lower heating elements 46 and 48 would thus be approximately 1510 watts.

In normal operation, the ambient air is heated sufficiently until the lower temperature set on the thermostat is reached and contacts 89 thus open. The full power circuit through heating element 48 from line 87 to line 90 is maintained completed by contacts 88. However, the circuit through heating element 46 from lines 87 to line 90 is now established through upper heating elements 54 and 56 whereby the heating elements 46, 54 and 56 are energized in series. The energizing circuit for motor 60 from lines 87 to 90 is established through line 94 and upper heating element 56, whereby motor 60 and heating element 56 are in series with each other. Under such circumstances the voltage drop across the motor 60 thus becomes approximately 90 to 92 volts, and the motor thus operates at a reduced speed of 70 to 80 percent of its maximum speed. Further the effective heat output through the various energized heating elements 46, 54 and 56 is reduced to approximately 89 watts, 115 watts, and 73 watts respectively. With the motor generating approximately 33 watts of power, and the heating element 48 yet operating at the full 725 watts of power, the total modulated output of the heater is approximately 1035 watts, or only approximately 69% of the maximum; and the heater operation continues at this reduced output.

Should the temperature nonetheless continue to rise in the enclosure, the thermostat contacts 88 would subsequently open which would deenergize all of the heating elements as well as the motor 60. The heater would thus be permitted to cool, and likewise the first contacts to close upon the thermostat sensing the cooling condition would be the contacts 88 which thus would return the system to the modulated output. Should there be a continued demand for the heater over and above that which is provided at the modulated output and contacts 89 close, the full heater output of approximately 1510 watts as indicated above would once again be discharged from the heater.

Figure 6:
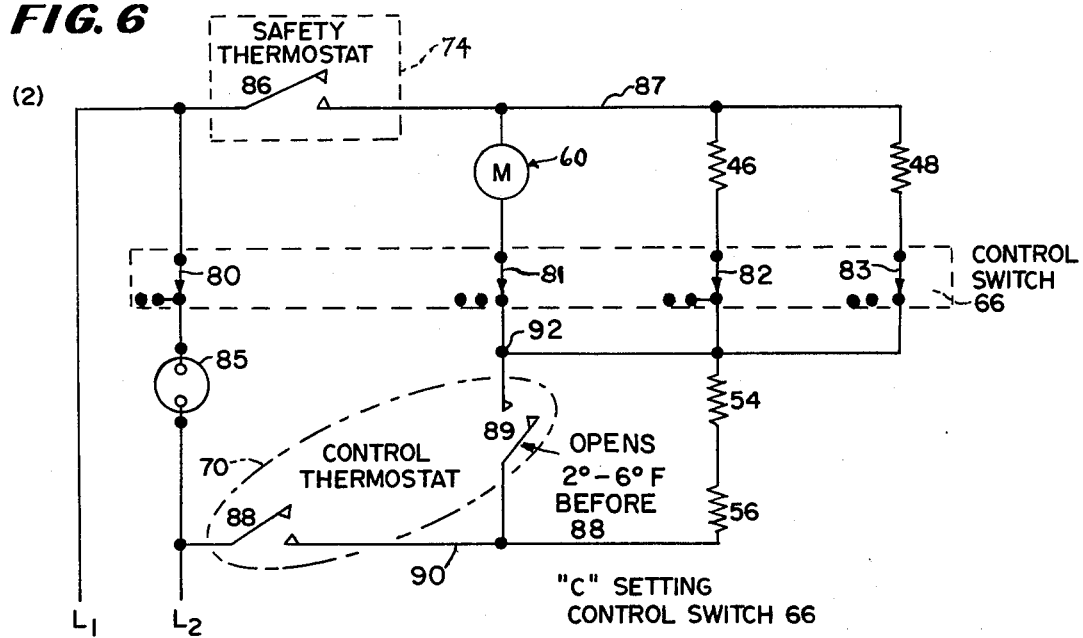
FIG. 6 is a circuit diagram of the schematic of FIG. 4 shown in a second selected operative mode.

Considering the operation of the heater with the switch 66 position in the right oriented or second operative mode, or against the contacts C as illustrated in the circuit diagram of FIG. 6, the indicator lamp 85 is still illuminated; the motor 60 is energized through the switch set 81 to terminal 92 and across the closed thermostat contacts 89 to line 90 to operate the motor at full line voltage. Likewise, the lower heating elements 46 and 48 are in the circuits via the switch sets 82 and 83 to terminal 92 to operate again each at full wattage. The output wattage with the energized motor (58 watts) and each of the separate heating elements (725 watts) would thus give a total heater output of approximately 1508 watts.

When the heat demand contacts 89 of the thermostat open upon indicating that the ambient air has reached the set temperature, the direct connection between terminal 92 and line 90 is broken.

The motor 60 and the lower heating elements 46 and 48, which are in parallel connection between line 87 and terminal 92, thus are connected in series through the heating elements 54 and 56 to the line 90. The effective drop in voltage between the line 87 and terminal 92 is approximately 25 volts whereas the voltage drop between terminal 92 and line 90 is approximately 95 volts. This low voltage sensed by the motor does not provide sufficient power to operate the motor but likewise does not provide sufficient power (approximately 2 watts) to cause any heat damage or the like to the motor. Moreover, the energized lower heating elements 46 and 48 develop approximately only 33 watts of power each so that the air passing over the motor is not heated much beyond ambient and this does not overheat or otherwise damage the motor. The heating element 54 develops approximately 182 watts and the heating element 56 develops approximately 86 watts, so that the total modulated power output is approximately 336 watts, or 22% of maximum.

With the fan stalled and not operating, the airflow through the heater is thus reversed from that which normally occurs during the high heat output conditions of the heater and enters the heater enclosure from the bottom openings 28 and passes in heat transfer relation over the energized heating elements for discharge from the upper heater openings 30 and 32.

If this modulated heat output is in excess of that required for the heat loss conditions of the room and contacts 88 open, the next phase of operation is the total deenergization of the motor and of the heater.

In each of the cycles noted above, should the control thermostat 70 fail and the contacts 88 and 89 not open, the safety thermostat contacts 86 would open upon an excess sensing of temperature from the energized heating elements and thereby would deenergize the motor and all heating elements. However, the indicator lamp would yet remain energized to appraise someone that power is yet connected to the heater and further that the control setting calls for power output to be delivered from the heater.

It is to be noted that in the conditions where the maximum output is achieved from the heating elements, the major contributor of such output is from the energized lower heating element 46 or 48, so that in effect again the air that passes over the motor is not heated to any extent that might overheat or damage the motor.

It is thus noted that the preferred mode of operation provides, in both operative settings of the control switch, a high heat output to heat the room quickly to a desired temperature, a modulated heat output less than maximum that should maintain the attained temperature without overshoot, and an off deenergized condition. The "large room" output operative setting of the control switch modulates between heat outputs of 100 and 60 to 70% of maximum approximately (1500 watts and 1000 watts for example) before being totally deenergized, for heater use in a high heat loss environment such as a large room, a room with poor insulation, or under cold conditions. The "small room" output operative setting of the control switch modulates between heat outputs of 100 and 20% to 30% of maximum approximately (1500 watts and 336 watts for example) before being totally deenergized, which should allow for heater use in a low heat loss condition such as in a small or a heavily insulated room, or at temperate conditions. Moreover, in each of the high output situations, the fan is operating to draw ambient air through the unit for discharge out the lower openings adjacent the floor, whereas the heater at only the lowest heat output condition operates by only convective airflow from the upper case openings. When the ambient temperature falls below the comfort level set on the thermostat, the heater automatically cycles to the higher heat output; whereas, if the temperature goes above the comfort level set on the thermostat, the heater automatically modulates to a lower heat output or totally off condition.

Referring now to specific safety features incorporated in the particular heater, it is noted that the mounting of the support frame assembly 36 to the case electrically insulates the case from the fan motor and from the heating elements. Specifically, the motor frame plate 43 has openings into which insulative plastic nuts 96 are embedded or trapped, and these nuts space the assembly from the case and receive bolts threaded therein from outside the case wall to separate the metal case from the metal frame assembly.

Moreover, an open wire grid 97 is connected across the upper and lower ends of frames 40 and 41 to keep a heating element, should it break, from falling onto the case structure to electrically energize the case. The baffle structure is formed of an insulated material, and insulation pads 98 further are bonded to and cover the side walls of the heater below the baffle to electrically and thermally insulate these portions of the case. Also, the heater elements themselves are surrounded by both the annular frame 40 or 41 and by the case exterior itself. This minimizes the attractiveness to young children of exposed glowing heating elements to eliminate a problem common to prior heaters, and even virtually precludes making contact with the heating elements upon intentionally poking through case openings.

Further, it should be noted that the control thermostat 70 is located outside of the annular frame 40 and generally horizontally even with it. Consequently, in the high heat output levels of the heater where the fan operates, the thermostat is in the forced airflow and thus provides good sensitivity of control. On the other hand, during the lowest level heat output condition where only the upper heating elements basically are being energized and the fan is not operating, the thermostat is outside of the convective airflow through the upper frame 40 to provide accurate sensing even yet of the ambient air conditions.

The safety thermostat 74 projects directly from the lower annular frame 41 toward the interior thereof and is exposed to the rapidly moving airflow through the venturi-type passage. Consequently, when the fan is operating, the proximately located heating elements 46 and 48 can be operating at full output and yet will not activate the thermostat 74. However, should a malfunction of the fan occur, the loss of airflow through the annular frame and over the heating elements 46 and 48 would quickly allow the temperature of the thermostat 74 to rise above that which would be deemed excessive and would thereby disconnect power to the heating elements.

Further, even total blockage of airflow through the heater, such as by means of accidentally covering the entire unit with a blanket, would yet thereafter allow safe heater operation. Under such conditions, the heater would cycle on and off rapidly as dictated by the temperatures sensed by either of the thermostats 70 or 74, but the ultimate output temperature of the heater would not be raised enough to cause any damage.

What is claimed is:

1. A portable electric heater, comprising a case defining an enclosure having separated air flow openings adjacent the opposite upper and lower ends thereof, a support frame secured to the case inside the enclosure between the upper and lower openings, a motor powered fan assembly mounted on the support frame, heating element means mounted on the support frame between the upper and lower openings, a control switch having high heat and low heat operative settings, a thermostat for sensing ambient air passing through the heater enclosure and having a set of control contacts closed during a heat demand situation and opened during a heat satisfied situation, control circuit means including the control switch and the thermostat for connecting electrically the heating element means and fan assembly in selective modes of operation and operable in the high heat operation control switch setting and in a heat demand situation to connect the heating element means in a first predetermined operating mode for providing high heat output and to connect the fan assembly motor for high speed operation and in a heat satisfied situation to connect said heating element means in a second predetermined mode of operation for providing a generally lower heat output approximately 60-70% of said high heat output and to connect the fan assembly motor for operation at a slower speed, and the circuit means further being operable in the low heat operative control switch setting and in a heat demand situation to connect the heating element means in said first predetermined mode of operation for providing said high heat output and to connect the fan assembly motor for high speed operation and operable in a heat satisfied situation to connect said heating element means in a third predetermined mode of operation for providing a substantially lower heat output, approximately 20 to 30% of said high heat output and to connect the fan assembly motor in a manner whereby said fan assembly is energized insufficiently for operation thereof, said fan assembly when operated, causing air to flow into the heater casing through the upper opening, over the energized heating element means and out the lower opening and when unoperated permitting a convective air flow only through the case enclosure from the lower opening, over the energized heating element means and out the upper opening.

2. A portable electric heater according to claim 1 wherein the thermostat further includes a second set of normally closed control contacts that open upon an overheat situation upon the sensed ambient air rising to a temperature higher than that at the heat satisfied situation, said second set of control contacts being operable to deenergize completely the heating element means and the fan assembly.

3. A portable electric heater according to claim 1 further including insulator means located between the support frame and the case to space the former from the latter, said insulator means serving to electrically insulate the motor and heating element means from the case.

4. A portable electric heater according to claim 1 wherein said heating element means includes upper and lower heating elements supported between said fan assembly and said respective upper and lower openings and further including a pair of upper and lower annular frames spaced apart and means supporting the upper and lower heating elements respectively within the upper and lower annular frames, and a baffle disposed across the case in tight relation around the lower annular frame operable to isolate the upper and lower openings from the other except for communication through the lower annular frame.

5. A portable electric heater, comprising a case defining an enclosure having separated air flow openings adjacent the opposite upper and lower ends thereof, respectively, heating element means mounted in the case enclosure between the upper and lower openings, air moving means for drawing outside air into the case enclosure through the upper opening for passage over the heating element means and for discharge out the lower opening, thermostat means for sensing the temperature of the air passing through the case enclosure and having a first set of control contacts closed during a heat demand situation and opened at a first predetermined temperature at a heat satisfied situation and a second set of control contacts closed normally and opened only during an overheat situation occurring at a second predetermined temperature, higher than said first predetermined temperature, control circuit means including said heating element means, thermostat means and said air moving means, the thermostat means operable for energizing the heating element means and air moving means, respectively, at high output thereof when the temperature of the air passing through the case enclosure is less than said first predetermined temperature, during the heat demand situation, and for energizing the heating element means at a substantially lower heat output and effectively deenergizing the air moving means when the temperature of the air passing through said case enclosure reaches said first predetermined temperature, during the heat satisfied situation, whereby convective air flow only passes through the case enclosure from the lower opening over the heating element means for discharge from the heater casing out the upper opening, and the heating element means and the air moving means being deenergized completely when the temperature of the air passing through said case enclosure reaches said second predetermined temperature in the overheat situation.

6. A portable electric heater, comprising a case defining an enclosure having separated air flow openings adjacent the opposite upper and lower ends thereof, heating element means mounted in the case enclosure between the upper and lower openings, air moving means for drawing outside air into the case enclosure through the upper openings for passage over the heating element means and for discharge out the lower openings, a control switch having high heat and low heat operative settings, a thermostat for sensing ambient air passing through the case enclosure and having a set of control contacts closed during a heat demand situation and opened during a heat satisfied situation, control circuit means including the control switch and thermostat operable for energizing the heating element means and air moving means at high outputs thereof in both the high heat and the low heat operative control switch settings during the heat demand situation, and for energizing the heating element means and air moving means at modulated lower outputs in the high heat operative control switch setting during the heat satisfied situation, and for energizing the heating element means for only a modulated lowest heat output and effectively deenergizing the air moving means in the low heat operative control switch setting during the heat satisfied situation whereby convective air flow only passes through the case enclosure from the lower openings over the heating element means for discharge from the heater out the upper openings.

7. A portable electric heater according to claim 6, further wherein the heating element means include a pair of upper heating elements and a pair of lower heating elements and wherein the air moving means is powered by a single speed motor, and further wherein the circuit means provides in the high heat operative control setting and in a heat satisfied situation a parallel connection of one of the lower heating elements and the air moving means motor and a series connection of said motor and one of the upper heating elements, whereby the said heating elements and the air moving means motor are energized only at modulated outputs, each lower than maximum thereof.

8. A portable electric heater according to claim 7, wherein the circuit means further provided in the low heat operative control setting and in a heat satisfied situation, a parallel connection of both lower heating elements and the air moving means motor, and a series connection of said motor and both of the upper heating elements, whereby the heating elements are energized for modulated lowest output, but the voltage drop across the heating elements is so large as to provide insufficient voltage drop across the air moving means motor to operate the same.

9. A portable electric heater including in combination:

an outer casing defining an enclosure having an upper and lower end, said casing having separated air flow openings adjacent the upper and lower end, respectively, of said enclosure, heating element means mounted within said enclosure between the upper and lower openings, electrically operated air moving means for moving air into the enclosure through the upper opening, over the heating element means and out the lower opening, control switch means operable between inoperative and operative settings, a thermostat for sensing the temperature of the air passing through said enclosure and including contact means operable to a first state when the air temperature is below a first predetermined level during a heat demand condition and operable to a second state when the air temperature reaches said first predetermined level at a heat satisfied condition, control circuit means connectable to a source of electrical power and including said control switch means, said heating element means, said air moving means and said thermostat, said control circuit means being operable in a first mode when said control switch means is operated to said operative setting and the contact means of said thermostat are operated to said first state for energizing said heating element means to a high heat output level and said air moving means at a relatively high speed and in a second mode in response to the contact means of said thermostat being operated to said second state for energizing said heating element means to a substantially lower heat output level and for effectively deenergizing said air moving means, the air flow passing by convection into said enclosure through the lower opening, over said heating elements and out said upper opening in said last-mentioned mode of operation, said control circuit means being operated automatically between said first and second modes of operation in response to temperature changes of said air between said first predetermined level and below.

10. A portable electric heater as claimed in claim 9 wherein said control switch means further includes a second operative setting, said control circuit means being operable in a third mode when said control switch means is operated to said second operative setting and the contact means of said thermostat are operated to said first state for energizing said heating element means to a high heat output level and said air moving means at a relatively high speed, and in a fourth mode in response to the contact means of said thermostat being operated to said second state for energizing said heating element means to a lower heat output level, less than said high heat output level but greater than said substantially lower heat output level of said first operative control switch means setting and said air moving means at a slow speed, said control circuit means being operated automatically between said third and fourth modes of operation in response to temperature changes of said air between said first predetermined level and below when said control switch means is in said second operative setting.

11. A portable electric heater as claimed in claim 9 wherein said thermostat further includes second contact means connected in said control circuit means and operable from a first to a second state for deenergizing said heating element means and said air moving means when said air temperature reaches a temperature predeterminedly above said first predetermined temperature level.

12. A portable electric heater as claimed in claim 11 further including safety thermostat means having contact means connected in said control circuit means and operable from a first to a second state for deenergizing said heating element means and said air moving means when said air becomes overheated and reaches a temperature predeterminedly above the temperature required to operate said second contact means from said first to said second state.

13. A portable electric heater as claimed in claim 9 wherein said heating element means includes upper and lower heating element means mounted in said enclosure adjacent said upper and lower openings, respectively, wherein upon operating said control circuit means in said first mode said lower heating element means is connected in parallel relation with said air moving means and wherein upon operating said control circuit means in said second mode said lower and upper heating element means are connected in series relation and said air moving means is connected in series relation with said lower heating element means, whereby the voltage across said air moving means is insufficient to energize the latter for operation thereof.

14. A portable electric heater including in combination:

an outer casing defining an enclosure having an upper and lower end, said casing having separated air flow openings adjacent the upper and lower end, respectively, of said enclosure, heating element means mounted within said enclosure between the upper and lower openings, electrically operated air moving means for moving air into the enclosure through the upper opening, over the heating element means and out the lower opening, control switch means operable between inoperative and operative settings, a thermostat for sensing the temperature of the air passing through said enclosure and including contact means operable to a first state when the air temperature is below a first predetermined level during a heat demand condition and operable to a second state when the air temperature reaches said first predetermined level at a heat satisfied condition, control circuit means connectable to a source of electrical power and including said control switch means, said heating element means, said air moving means and said thermostat means, said control circuit means being operable in a first mode when said control switch means is operated to said operative setting and the contact means of said thermostat are in said first state for energizing said heating element means to a high heat output level and said air moving means at a relatively high speed, and in a second mode in response to the contact means of said thermostat being operated to said second state for energizing said heating element means to a low level heat output level and said air moving means at a slow speed, said control circuit means being operated automatically between said first and second modes of operation in response to temperature changes of said air between said first predetermined level and below when said control switch means is in said operative setting.

15. A portable electric heater as claimed in claim 14 wherein said control switch means further includes a second operative setting, said control circuit means being operable in a third mode when said control switch means is operated to said second operative setting and the contact means of said thermostat are operated to said first state of energizing said heating element means to said high heat output level and said air moving means to a relatively high speed, and in a fourth mode in response to the contact means of said thermostat being operated to said second state for energizing said heating element means to a lowest heat output level, lower than said low heat output level of said first operative control switch means setting and for effectively deenergizing said air moving means, whereby air flow through said enclosure is produced by convection into said lower opening, over said heating element means and out said upper opening, said control circuit means being operated automatically between said third and fourth modes of operation in response to temperature changes of said air between said first predetermined level and below when said control switch means is in said second operative setting.

* * * * *